United States Patent
Kanie et al.

(10) Patent No.: US 9,333,554 B2
(45) Date of Patent: May 10, 2016

(54) PANEL FASTENING RIVET MECHANISM

(71) Applicant: ILLINOIS TOOL WORKS INC., Glenview, IL (US)

(72) Inventors: Hideki Kanie, Aichi (JP); Yasuomi Omori, Aichi (JP); Jesse L. Jensen, Chippewa Falls, IL (US)

(73) Assignee: Illinois Tool Works, Inc, Glenview, IL (US)

( * ) Notice: Subject to any disclaimer, the term of this patent is extended or adjusted under 35 U.S.C. 154(b) by 131 days.

(21) Appl. No.: 14/357,219

(22) PCT Filed: Nov. 8, 2012

(86) PCT No.: PCT/US2012/064077
§ 371 (c)(1),
(2) Date: May 9, 2014

(87) PCT Pub. No.: WO2013/070863
PCT Pub. Date: May 16, 2013

(65) Prior Publication Data
US 2014/0310945 A1   Oct. 23, 2014

Related U.S. Application Data

(60) Provisional application No. 61/558,917, filed on Nov. 11, 2011.

(51) Int. Cl.
*F16B 19/08* (2006.01)
*F16B 19/10* (2006.01)
(Continued)

(52) U.S. Cl.
CPC ............ *B21J 15/041* (2013.01); *F16B 19/1027* (2013.01); *F16B 19/1081* (2013.01); *Y10T 29/49956* (2015.01)

(58) Field of Classification Search
CPC .. F16B 19/1081; F16B 19/109; B21J 15/041; Y10T 29/49956; Y10T 29/49954; Y10T 29/49948; Y10T 29/49952

USPC .................. 411/45, 46, 41, 48, 60 A
See application file for complete search history.

(56) References Cited

U.S. PATENT DOCUMENTS 3,112,547 A    12/1963  Poe
4,927,287 A *  5/1990   Ohkawa ................ F16B 21/086
                                                   24/297

(Continued)

FOREIGN PATENT DOCUMENTS

WO    WO 03072957 A2 *  9/2003 ............ B29C 45/006
WO    WO 2015076892 A1 * 5/2015 ............. F16B 21/07

OTHER PUBLICATIONS

ISR and WO for PCT/US2012/064077 mailed Jan. 18, 2013.

*Primary Examiner* — Essama Omgba
(74) *Attorney, Agent, or Firm* — Joseph M. Butscher; The Small Patent Law Group, LLC

(57) ABSTRACT

A retention clip assembly to join individual panels with aligned pilot holes comprises a body having an enlarged flange and a generally cylindrical leg defined by a plurality of spaced leg segments surrounding a pin insertion hole. The leg segments are separated by spaced slits and define a central passage. A pin having an enlarged head and an elongate shaft is slidable in the central passage. It engages cam projections on the interiors of the leg segments and expands the segments to secure the body to the panels. The pin includes flexible fingers having radially outer surfaces spaced apart a distance greater than the body leg deformable toward the pin shaft. The flexible fingers pass through the body flange and expand after surpassing the pilot holes in the panels. The flexible fingers slide in diametrically opposed slits, contact the edges of the pilot holes and stabilize the clip assembly within the pilot holes.

18 Claims, 5 Drawing Sheets

(51) Int. Cl.
  *B21J 15/02* (2006.01)
  *B21J 15/04* (2006.01)

(56) References Cited

U.S. PATENT DOCUMENTS

| | | | |
|---|---|---|---|
| 4,952,106 A * | 8/1990 | Kubogochi | F16B 19/1081 411/48 |
| 5,163,795 A | 11/1992 | Benoit et al. | |
| 5,632,581 A | 5/1997 | Hasada | |
| 6,354,574 B1 | 3/2002 | Oliver et al. | |
| 6,364,586 B1 * | 4/2002 | Okada | F16B 21/08 411/41 |
| 6,481,942 B2 * | 11/2002 | Tanaka | F16B 19/1081 411/41 |
| 6,769,849 B2 * | 8/2004 | Yoneoka | F16B 5/0642 411/41 |
| 6,910,840 B2 * | 6/2005 | Anscher | F16B 19/1081 411/41 |
| 7,105,119 B2 * | 9/2006 | Kanie | F16B 19/1081 264/238 |
| 7,249,922 B2 * | 7/2007 | Yoneoka | F16B 19/1081 411/41 |
| 7,484,919 B2 * | 2/2009 | Hansen | F16B 19/1081 411/41 |
| 8,419,330 B2 * | 4/2013 | Watanabe | F16B 19/1081 411/45 |
| 8,956,095 B2 * | 2/2015 | Sato | F16B 19/1081 24/458 |
| 9,181,968 B2 * | 11/2015 | Handa | F16B 19/1081 |
| 2002/0001513 A1 * | 1/2002 | Tanaka | F16B 19/1081 411/45 |
| 2004/0175250 A1 | 9/2004 | Yoneoka | |
| 2005/0019130 A1 * | 1/2005 | Kanie | F16B 19/1081 411/45 |
| 2007/0172327 A1 * | 7/2007 | Hansen | F16B 19/1081 411/41 |
| 2012/0174354 A1 * | 7/2012 | Sato | F16B 19/1081 24/595.1 |
| 2013/0280005 A1 * | 10/2013 | Lepper | B60R 13/0206 411/15 |

\* cited by examiner

PANEL FASTENING RIVET MECHANISM

CROSS-REFERENCE TO RELATED APPLICATION

This application is a National Phase of International Application Number PCT/US2012/064077 filed Nov. 8, 2012 and claims priority pursuant to Title 35 USC §119(e) to U.S. Provisional Application Serial No. 61/558,917, filed Nov. 11, 2011, entitled "Panel Fastening Rivet Mechanism," the entire specification and drawings of which are hereby incorporated by reference herein as if fully set forth.

BACKGROUND

This disclosure relates to a retention clip to fasten two panels together to retain one to the other. More particularly, it relates to such a clip suitable for joining such panels in instances where pilot holes in each panel are of different diameter or present excessive clearance with the fastener leg.

U.S. Pat. No. 5,632,581 entitled "Clip" issued Mar. 27, 1997 and assigned to Illinois Tool Works, Inc., Glenview, Ill., discloses a clip useful to join two panels. It is used in assembly of various panel components and is particularly suitable for assembly of panel components in the automotive industry. The entire specification and drawings of that patent are incorporated by reference herein as if fully set forth.

Retention clips are used, in a known manner, to fasten together two panels or plates having aligned pilot holes. The body includes a flat flange portion with a central hole and a leg formed by spaced leg segments depending from a bottom wall surrounding the central hole in a cylindrical pattern. The interior of the distal ends of the leg segments include inwardly directed cam portions. A separate pin comprising an enlarged head and elongate generally cylindrical shaft is positioned in a preassembled active position above the body flange with the distal end of the pin shaft in the central hole above the passage formed by the leg segments.

The body leg is inserted through the aligned pilot holes and the pin driven into a final position, residing within the interior of the spaced leg segments. Insertion of the pin causes its exterior surface to engage the cam portions on the interior of the distal ends of the segmented legs urging them outward to expand the outer perimeter of the distal end of the leg segments. Abutting contact of the cam portions with the exterior surface of the pin maintains the expanded condition and prevents removal of the body and pin from the panel pilot holes thereby fastening the panels together.

It has been found that securement satisfactory to the rigors of automotive applications require particular attention to the size of the pilot holes in the panels and the thickness of the panels. As a result, versatility of the clips may be limited by the size of, and clearance with, the pilot holes that receive them. These latter parameters are often dictated by the automotive manufacturer.

It has been determined that a clip design capable of panel securement over a wide range of pilot hole dimensions and panel thickness is valuable to the marketplace. A given clip suitable for a wide range of applications reduces manufacturing and assembly costs, and inventory requirements.

SUMMARY OF THE DISCLOSURE

The panel fastening rivet or retention clip assembly of the present disclosure comprises an assembly consisting of injection-molded plastic pin and body elements. As in known designs, the clip body includes an enlarged flange and a generally cylindrical segmented leg for disposition in pilot holes of the panels to be joined. The clip assembly pin includes a head and generally cylindrical shaft driven into the body to expand the body leg segments to complete the fastening connection.

The fastening arrangement of the present disclosure is suitable for a large range of hole sizes and panel thicknesses. The pin includes resilient flexible fingers that, in larger hole sizes, engage the primary panel before the leg segments of the body contact the panel. The resilient nature of the flexible fingers maintain the panel rivet assembly in contact with the panels to minimize undesirable vibration and noise.

In one form, the pin is configured to keep the leg segments of the body from being pushed into the gaps between the leg segments, improving fastener resistance to dislodgement.

DETAILED DESCRIPTION OF THE ILLUSTRATED EMBODIMENTS

Figure 2:
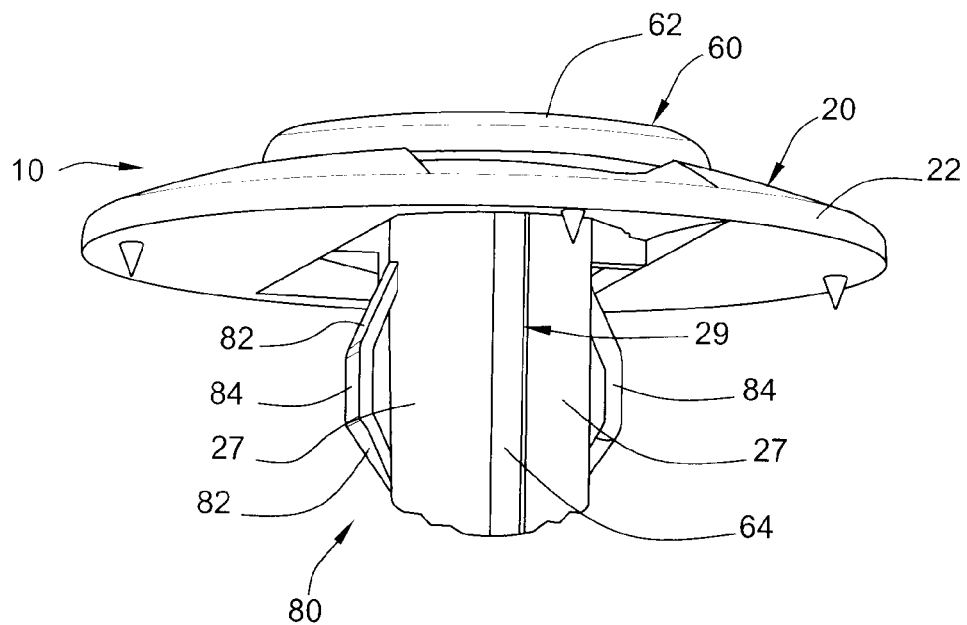
FIG. 2 is a fragmentary perspective view of the panel rivet assembly of FIG. 1 with the pin in a fully inserted position.
Figure 3:
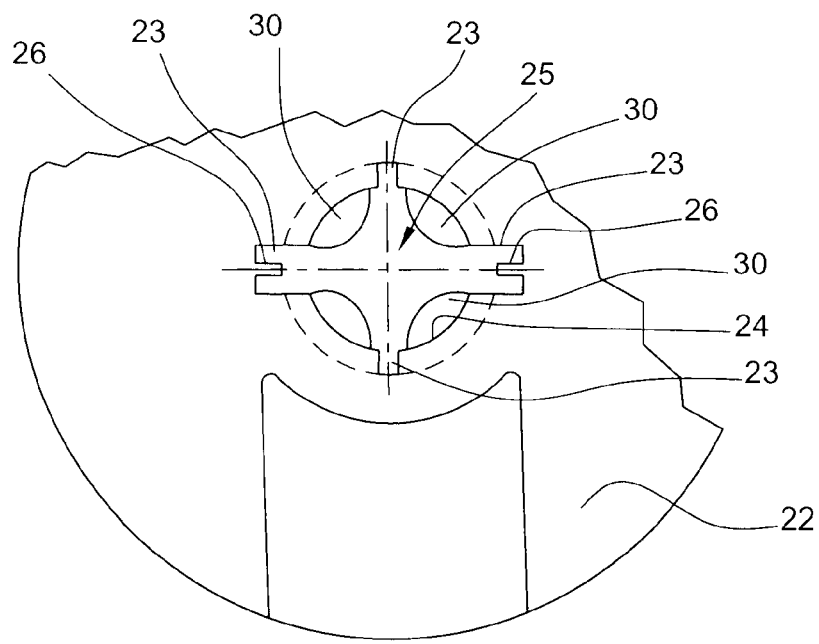
FIG. 3 is a fragmentary top view of the body of the panel rivet assembly of FIG. 1.
Figure 4:
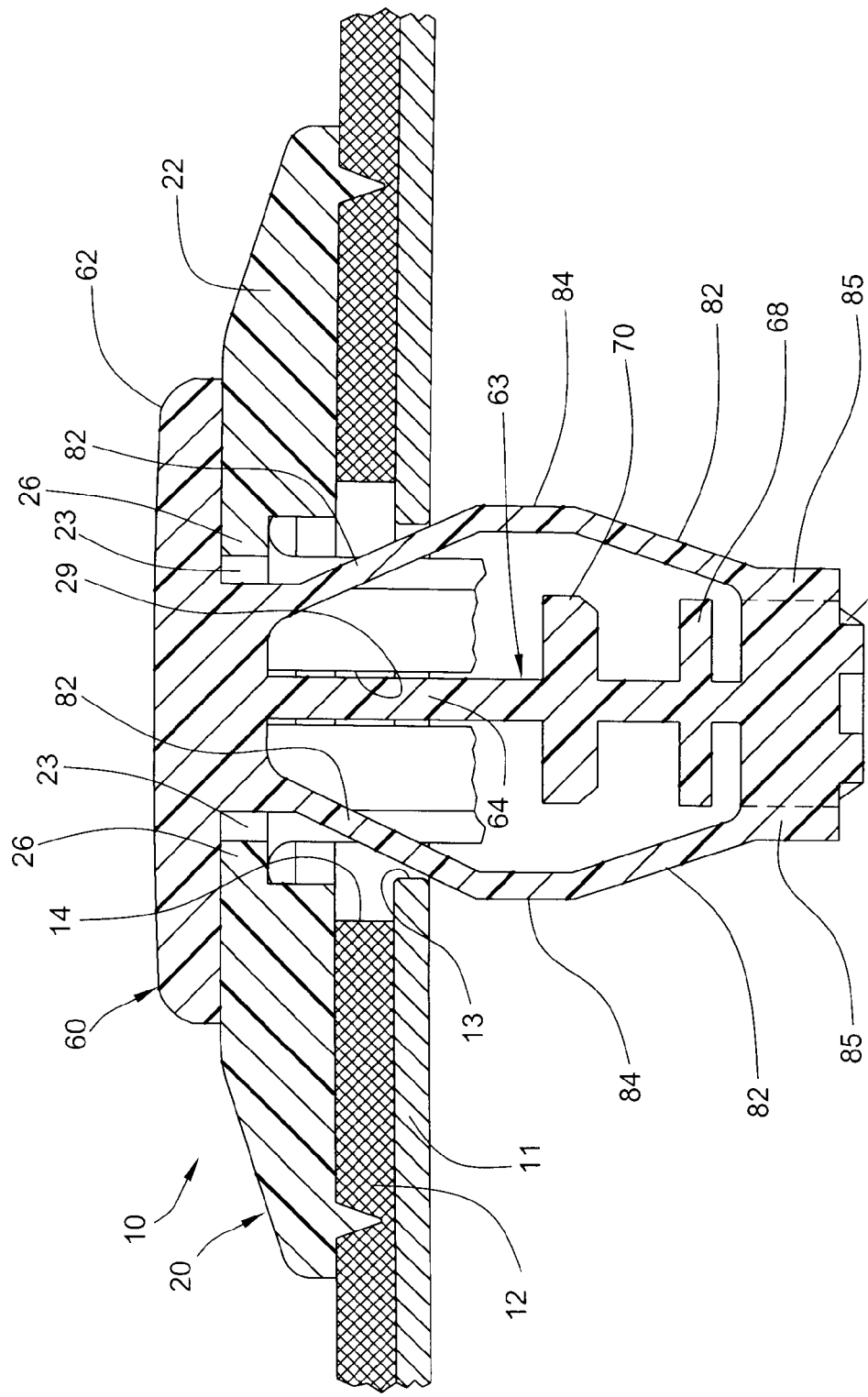
FIG. 4 is a fragmentary sectional view of the panel rivet assembly of FIG. 1, in an installed condition, along a plane passing through the flexible fingers of the pin illustrating certain features of the present disclosure.

Turning now to the drawings, there is illustrated in FIGS. 1 to 7 a panel rivet assembly or retention clip in accordance with the present disclosure. As seen in FIG. 4, the panel rivet assembly 10 is employed to join components of a structure, here illustrated as two separate panels, 11 and 12. Taken as exemplary, panel 11 may be a sheet metal component such as an automotive hood panel. Panel 12 may be a relatively flexible component such as a composite sound deadening pad or the like.

As illustrated in FIG. 4, the panel 11 has one or more pilot holes 13. Panel 12 has one or more pilot holes 14 aligned with the pilot holes in the sheet metal panel 11. A fastening rivet 10 is used at each set of pilot holes to connect the separate panels. In the illustrated installation of FIG. 4, the pilot holes 13 and 14 are larger in diameter than the diameter of the insertable leg of the body 20 of the retention clip assembly 10.

Figure 1:
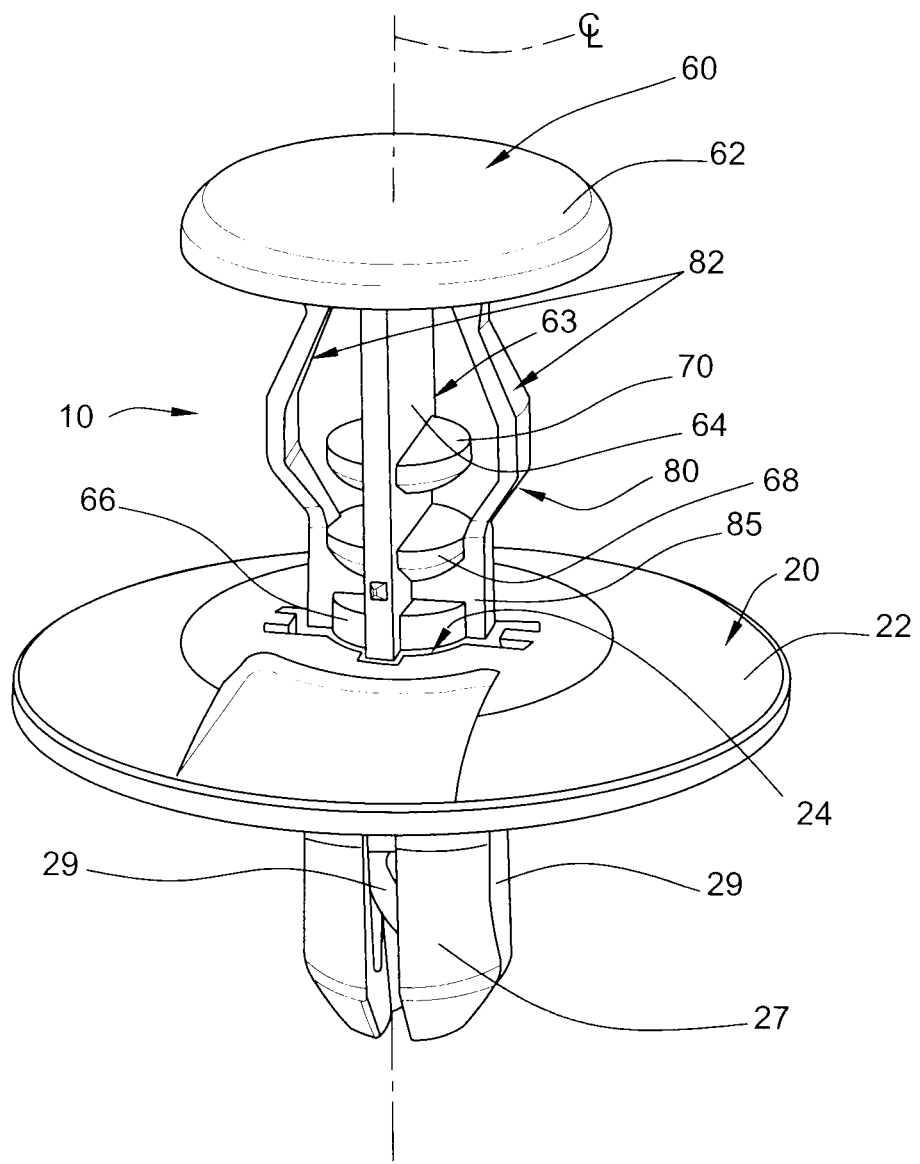
FIG. 1 is a perspective view of the panel rivet assembly of the preset disclosure comprising a body and pin aligned along a longitudinal axis.

FIG. 1 shows the clip assembly 10 comprising two components, a body 20 and a pin 60 injection molded of polymeric material. The body 20 and pin 60 are elongate along a longitudinal axis CL. They are preassembled into an active condition with the pin retained above the body.

In this disclosure, the terms "longitudinal", "axial" or "axially" mean along the longitudinal axis CL of the body 20 and pin 60. "Radial" or "radially" means perpendicular to the longitudinal axis. "Inward" means toward the longitudinal axis and "outward" means away from the longitudinal axis.

In use, the clip 10, may be in any orientation. For purposes of illustration and description, reference made herein to "top" or "bottom", "upper" or "lower", "above" or "below" is intended for ease of understanding the structure shown in the accompanying drawings.

The body 20 has a disc-like flange 22 with a central pin insertion hole 24 seen in FIG. 3. The flange 22 is larger than the pilot holes and prevents passage of the body through the pilot holes. When installed, the bottom surface of disc-like flange 22 resides in contact with a surface of the upper panel.

Four leg segments 27 in a circular pattern define a generally cylindrical depending leg with a central passage 25. The segments 27 depend from the bottom surface of flange 22 surrounding the hole 24. The central passage 25 and the insertion hole 24 are generally of the same diameter. As seen in FIGS. 1 and 3, leg segments 27 are arcuate in cross section and separated by four equally spaced slits 29. The interior of each leg segment 27 includes a radial inward cam projection 30 at its distal, or free end.

Referring to FIG. 3, the enlarged flange 22 includes notches 23 which align with the slits 29 and extend through the flange. Two diametrically opposed notches 23 are wider than the other two diametrically opposed notches, and include radially inwardly directed tabs 26 having facing end surfaces. The distance between the end surfaces of tabs 26 is approximately the same as the outer diameter of the depending generally cylindrical leg of body 20 defined by leg segments 27.

The pin 60 has an enlarged disc-like head portion 62 and an integral elongate shaft 63 slidable in passage 25. The clip components are pre-assembled together in an active condition with the free or distal end of pin shaft 63 inserted in pin insertion hole 24, aligned along longitudinal axis CL. On full insertion of pin 60 into body 20, the bottom surface of enlarged head 62 of pin 60 is in contact with the top surface of enlarged flange 22 of body 20.

The elongate shaft 63 of pin 60 includes an elongate rectangular portion 64 depending from enlarged head 62. As seen in FIGS. 1 and 2, rectangular portion 64 includes opposed edges slidable within two of the diametrically opposed slits 29 between leg segments 27 of body 20.

As seen in FIG. 4, shaft 63 terminates at its free end in a cylindrical base 66 having an outer cylindrical surface slidable within central passage 25 defined by leg segments 27. The outer cylindrical surface of base 66 is positioned to contact cam projections 30 on insertion of shaft 63 into passage 25.

A disc 68, has an outer cylindrical surface the same size as outer cylindrical surface of base 66, and is also slidable in central passage 25. It is positioned toward the head 62 from the base 66 to contact cam projections 30 on segments 27 on full insertion of pin 60 into body 20. A second disc 70 having the same size outer cylindrical surface is formed on leg 64 toward head 62 from disc 68. It is slidable in central passage 25 and functions as discussed below.

Notably, the diameter of cylindrical base 66 and disc 68 is slightly smaller than the central passage 25 defined by leg segments 27. It is, however, sufficiently larger than the distance between cam projections 30 that insertion of pin 60 into passage 25 spreads the free or distal ends of leg segments 27 radially outward. This action deforms the leg segments 27 radially outward, which fixes the clip 10 within the pilot holes in joined panels 11 and 12. The expanded leg of the body 20 cannot be withdrawn from the pilot holes.

Figure 7:
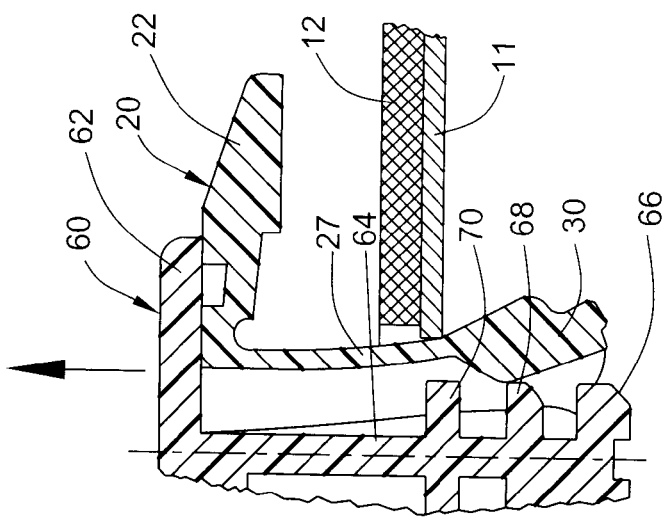
FIG. 7 is a fragmentary sectional view of the assembly of FIG. 1 in a condition further withdrawn from the connected panels illustrating additional coaction between the body leg segments and pin of the present disclosure.
Figure 8:
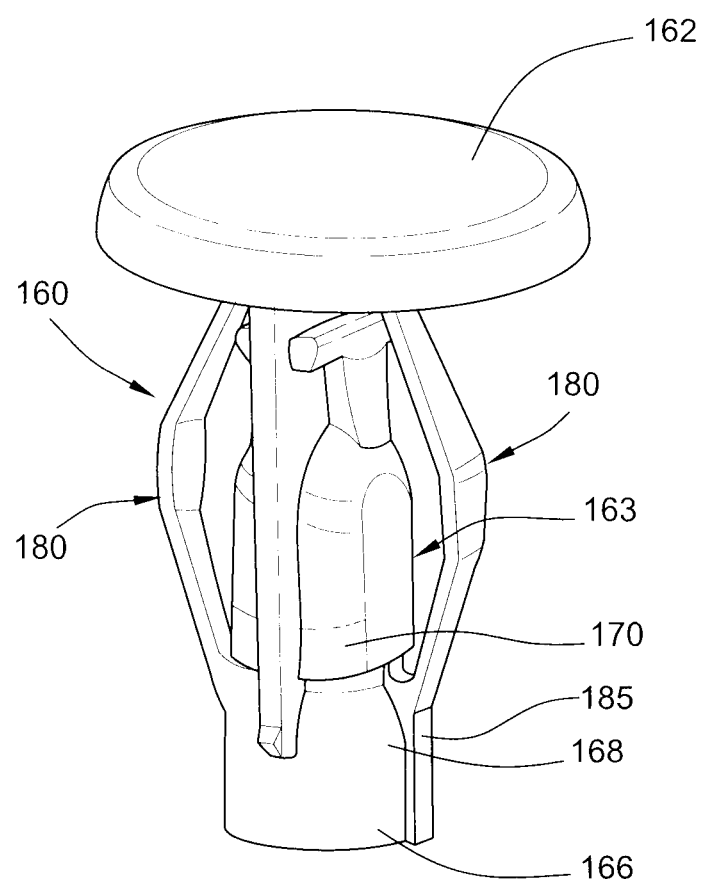
FIG. 8 is a perspective view of a modified form of pin for the panel rivet assembly.

FIG. 8 shows an alternative form of pin 160 with an enlarged head 162 and elongate shaft 163. The outer surface of shaft 163 is generally cylindrical at base 166, and an area 166 positioned as is the disc 66 in the embodiment of FIGS. 1 to 7. The shaft 163 also defines a generally cylindrical surface 170 in the same position as the surface 70 in the earlier embodiment. Cylindrical surfaces 166, 168 and 170 are similarly sized, and serve the same function, as surfaces 66, 68 and 70 of pin 60 of the embodiment of FIGS. 1 to 7.

In accordance with the present disclosure, pin 60 includes two integrally formed diametrically opposed flexible fingers 80. Each finger 80 has an end joined to the bottom of head 62 and includes a longitudinal rib 85 on base 66. Ribs 85 are slidable in diametrically opposed slits 29 positioned at ninety degrees (90°) to the slits 29 slidably supporting the opposed edges of rectangular portion 64 of shaft 63. Note also that the pin 163 in the embodiment of FIG. 8 includes flexible expansion fingers 180 identical to the flexible fingers 80 in the embodiment of FIGS. 1 to 7.

Returning to FIGS. 1 to 7, the expansion fingers 80 include axially extending diametrically opposed parallel portions 84 the radially outer surfaces of which are spaced apart a distance larger than the diameter of the generally cylindrical leg and also larger than the pilot holes in panels 11 and 12. In this regard, the distance between the outer surfaces of parallel portions 84 of flexible fingers 80 is larger than the distance between the facing end surfaces of tabs 26. This distance may be up to twice the dimension of the diameter of the central passage 25 defined by the leg segments 27 and consequently the diameter of the shaft 63 of pin 60.

The parallel portions 84 of flexible fingers 80 are connected to the bottom of head 62 by top angular portions 82 and to base 66 by bottom angular portions 83 that merge with ribs 85.

Parallel portions 84 are configured to slide through the notches 23 containing tabs 26 on insertion of pin 60 into head 20. The angular portions 82 of flexible fingers 80 are somewhat narrower than parallel portions 84 and provide the requisite flexibility to be deformed and permit parallel portions 84 to move radially inward toward shaft 63 and pass through notches 23. Also, on insertion of the pin 60 into body 20, the angled portions 82 of fingers 80 pass into and slide within the slits 29 aligned with tabs 23. Once within the slits, that is, beyond pin insertion hole 24 of disc-like flange 22 of body 20, the angled portions of flexible fingers 80 resume their natural undeformed shape and expand radially outward.

FIG. 4 shows retention clip assembly 10 of the present disclosure, joining two panels 11 and 12. The clip assembly 10 of this disclosure is particularly suitable for making an effective joinder of the panels illustrated by virtue of the presence of flexible fingers 80, in particular, because the dimension across the parallel portions 84 of expansion fingers 80 is larger than the diameter of insertion holes in panels 11 and 12. To join panels 11 and 12, the depending leg of body 20 is inserted into reception holes 13 and 14 until the bottom surface of flange 22 rests against the upper surface of panel 12. The pin 60 is then axially advanced along longitudinal axis CL into body 20 causing shaft 63 to slide inward of leg segments 27 and flexible fingers 80 to pass between the facing ends of tabs 26 within diametrically opposed notches 23. The opposed edges of rectangular portion 64 slide in the other diametrically opposed slits 29 between leg segments 27.

Parallel portions 84 of flexible fingers 80 make sliding contact with ends of tabs 26 to force angled portions 83 of flexible fingers 80 to deform radially inward permitting passage through pin insertion hole 24 and the pilot holes 13 and 14 in panels 11 and 12. Once the flexible fingers 80 surpass the bottom surface of panel 12, the flexible nature of the angled portions 82 of fingers 80 cause them to expand radially outward in slits 29. As a result, the upper angled portions 82 make contact with the edge of pilot hole 13 in bottom panel 11. Such contact stabilizes the clip 10 relative to the panels 11 and 12 to insure a firm relationship with minimum lateral (side-to-side) or other movement that might cause undesirable noise or vibration.

Figure 5:
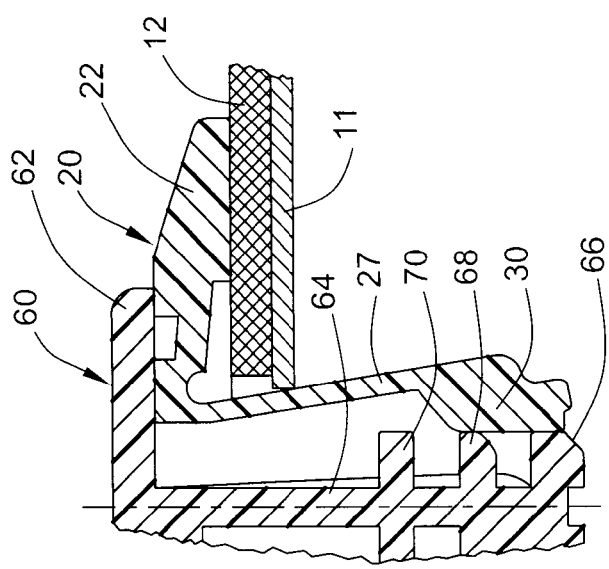
FIG. 5 is a fragmentary sectional view of the assembly of FIG. 1 in an installed, panel joining, condition, taken along a plane perpendicular to the view in FIG. 4 illustrating the interaction of the body leg segments and pin of the present disclosure.

As illustrated in FIG. 5, with pin 60 fully inserted into body 20, outer cylindrical surfaces of base 66 and disc 68 contact cam projections 30 on leg segments 27 to radially expand the free ends of leg segments 27. The expanded leg segments 27 of the body 20 secure the body within the pilot holes 13 and 14 because the segments 27 assume a diameter at the free or distal end of the leg segments 27, larger than the diameter of pilot hole 13.

Figure 6:
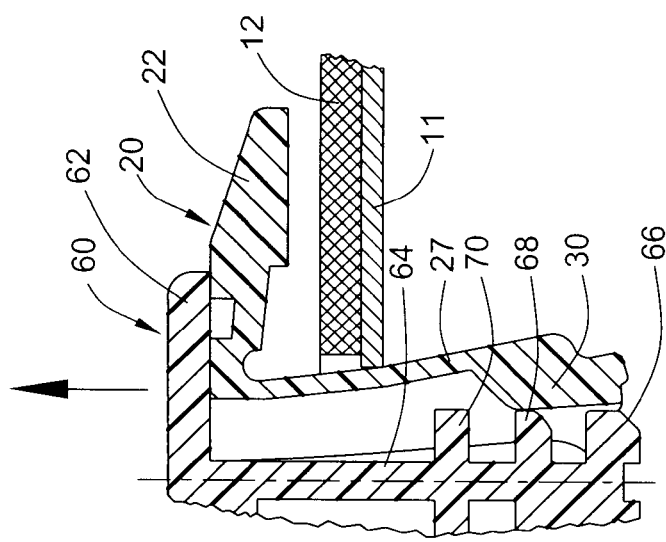
FIG. 6 is a fragmentary sectional view of the assembly of FIG. 1 in a condition partially withdrawn from the connected panels illustrating further coaction between body leg segments and pin of the present disclosure.

As illustrated in FIG. 6, disc 68 also supports the expanded free ends of leg segments 27 against effort to retract the clip 10 from the panels 11 and 12. Movement of the bottom surface of flange 22 away from contact with panel 12 cause further deformation of leg segments 27 by virtue of their connection to the bottom surface of flange 22 and the contact of cam projections 30 against the cylindrical surface of disc 68.

Similarly, as seen in FIG. 7, further retraction of body 20 from panels 11 and 12 creates more pronounced deflection or distortion of leg segments 27 by virtue of the retention of the free end of the leg segments in radially expanded condition by contact of cam projections 30 with cylindrical surface of disc 68. Moreover, inward deflection of the leg segments cause the internal surfaces of the leg segments to contact with outer cylindrical surface of disc 70 to provide contacting support for the leg segments.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A retention clip assembly comprising:
   a body having a longitudinal axis;
      an enlarged flange with a pin insertion hole, wherein said enlarged flange defines diametrically opposed notches, said notches including radially inwardly directed tabs having facing end surfaces;
   a leg comprising:
      a plurality of spaced leg segments depending from said enlarged flange surrounding said pin insertion hole and defining a central passage, wherein said diametrically opposed notches are aligned with diametrically opposed slits between said leg segments, wherein the distance between said end surfaces is approximately equal to the diameter of said leg of said body defined by said leg segments;
      each said leg segment including a radially inward cam projection at a distal end,
   a pin having
      an enlarged head portion;
      an elongate shaft depending from said head longitudinally slidable in said central passage and engageable with said cam projections on insertion of said pin into said body;
      said pin including flexible fingers with radial outer surfaces spaced apart a distance greater than the diameter of said shaft of said pin, wherein said facing end surfaces of said radially inwardly directed tabs are in sliding contact with said flexible fingers on insertion of said pin into said body;
   said fingers deformable toward said shaft of said pin.

2. A retention clip assembly as claimed in claim 1 wherein said leg segments are disposed in a circular pattern surrounding said pin insertion hole and are separated by at least two of said diametrically opposed slits, and wherein said flexible fingers of said pin are slidable in said diametrically opposed slits.

3. A retention clip assembly as claimed in claim 2 wherein said radially outer surfaces of said flexible fingers are spaced apart a distance greater than the diameter of said leg.

4. A retention clip assembly as claimed in claim 3 wherein said flexible fingers include diametrically opposed axially extending parallel portions defining said radially outer surfaces.

5. A retention clip assembly as claimed in claim 4 wherein said flexible fingers include angle portions connecting said parallel portions to said pin.

6. A retention clip assembly as claimed in claim 5 wherein said flexible fingers include top angle portions extending from said parallel portion to said head and bottom angle portions extending from said parallel portions to said distal end of said pin.

7. A retention clip assembly as claimed in claim 5 wherein said shaft of said pin includes a base at the distal end of said shaft defining a cylindrical surface having a diameter to engage said cam projections on full insertion of said pin into said central passage; and
   a disc disposed toward said head from said base having a cylindrical surface having a diameter the same as the diameter of said base disposed to engage said cam projections on full insertion of said pin into said central passage.

8. A retention clip assembly is claimed in claim 7 wherein said shaft of said pin includes a second disc spaced toward said head from said first disc, said second disc having an outer cylindrical surface having a diameter the same as the diameter of said first disc, and positioned to contact said leg segments on deformation of said leg segments toward said second disc.

9. A retention clip assembly as claimed in claim 1 wherein the distance between said radial outer surfaces of said flexible fingers is up to twice the diameter of said shaft of said pin.

10. A retention clip assembly as claimed in claim 9 wherein said leg segments of said body further define diametrically opposed additional slits equally spaced between said slits aligned with said notches containing said tabs;
   said enlarged flange includes diametrically opposed additional notches aligned with said additional slits, and said pin defines axial ribs slidable in said additional slits.

11. A retention clip assembly as claimed in claim 10 wherein said shaft of said pin includes an elongate rectangular portion extending from said head portion defining said axial ribs slidable in said additional slits.

12. A retention clip assembly as claimed in claim 10 wherein said shaft of said pin includes a base at the distal end of said shaft defining a cylindrical surface having a diameter to engage said cam projections on full insertion of said pin into said central passage; and a disc disposed toward said head from said base having a cylindrical surface having a diameter the same as the diameter of said base disposed to engage said cam projections on full insertion of said pin into said central passage.

13. A retention clip assembly is claimed in claim 12 wherein said shaft of said pin includes a second disc spaced toward said head from said first disc, said second disc having an outer cylindrical surface having a diameter the same as the diameter of said first disc, and positioned to contact said leg segments on deformation of said leg segments toward said second disc.

14. A method of securing together separate panels having aligned pilot holes, the steps comprising:

providing a retention clip assembly comprising:

a body having a longitudinal axis;

an enlarged flange with a pin insertion hole, wherein said enlarged flange defines diametrically opposed notches, said notches including radially inwardly directed tabs having facing end surfaces;

a leg comprising:

a plurality of spaced leg segments depending from said enlarged flange surrounding said pin insertion hole and defining a generally cylindrical leg with a central passage, wherein said diametrically opposed notches are aligned with diametrically opposed slits between said legs segments, wherein the distance between said end surfaces is approximately equal to the diameter of said leg of said body defined by said leg segments;

each said leg segment including a radially inward cam projection at a distal end, a pin having an enlarged head portion;

an elongate shaft depending from said head longitudinally slidable in said central passage and engageable with said cam projections on full insertion of said pin into said body;

said pin including flexible fingers with radially outer surfaces spaced apart a distance greater than the diameter of said leg, wherein said facing end surfaces of said radially inwardly directed tabs are in sliding contact with said flexible fingers on insertion of said pin into said body;

said fingers deformable toward said shaft of said pin;

the steps further comprising:

inserting said body in the aligned pilot holes of panels until the enlarged flange of said body contacts one of the panels, inserting said shaft of said pin into said body until said head contacts said flange of said body and said shaft engages said cam projections and deforms said leg segments radially outward and deforming said flexible fingers on insertion of said pin into said body, and causing sliding contact of parallel portions of said flexible fingers and said facing end surfaces of said tabs on insertion of said pin into said body to deform said flexible fingers.

15. A method as claimed in claim 14 wherein said leg segments are disposed in a circular pattern surrounding said pin insertion hole and are separated by at least two diametrically opposed slits, and wherein said flexible fingers of said pin are slidable in said diametrically opposed slits, the steps further comprising sliding said flexible fingers of said pin through said pin insertion hole on inserting said pin into said body.

16. A method as claimed in claim 15 wherein said parallel portion of said flexible fingers include diametrically opposed axially extending parallel portions defining said radially outer surfaces;

said flexible fingers include angle portions connecting said parallel portions to said pin slidable in said diametrically opposed slits and comprising:

top angle portions extending from said parallel portion to said head and bottom angle portions extending from said parallel portions to said distal end of said pin, the steps further comprising causing said angle portions of said flexible fingers to slide in said diametrically opposed slits on inserting said pin into said body.

17. A method as claimed in claim 14 wherein the distance between said radial outer surfaces of said flexible fingers is up to twice the diameter of said shaft of said pin;

wherein said leg segments of said body further define diametrically opposed slits equally spaced between said slits aligned with said notches containing said tabs;

said head includes diametrically opposed additional notches aligned with said additional slits, and said pin defines axial ribs slidable in said additional slits, the steps further comprising:

sliding said axial ribs in said additional slits on insertion of said pin into said body.

18. A method as claimed in claim 17 wherein said shaft of said pin includes a base at the distal end thereof defining a cylindrical surface having a diameter to engage said cam projections on full insertion of said pin into said central passage;

a disc disposed toward said head from said base having a cylindrical surface having a diameter the same as said base;

the steps further comprising engaging said cam projections with said base and said disc to outwardly deform said leg segments on insertion of said pin into said body.

* * * * *